(12) United States Patent
Ogasawara et al.

(10) Patent No.: US 8,251,130 B2
(45) Date of Patent: Aug. 28, 2012

(54) GAS LEAK DETECTING SYSTEM FOR GAS COOLER

(75) Inventors: Ryoji Ogasawara, Hiroshima (JP);
Tsukasa Shimakawa, Hiroshima (JP);
Michio Kubota, Hiroshima (JP)

(73) Assignee: Mitsubishi Heavy Industries Compressor Corporation, Tokyo (JP)

( * ) Notice: Subject to any disclaimer, the term of this patent is extended or adjusted under 35 U.S.C. 154(b) by 773 days.

(21) Appl. No.: 11/922,603

(22) PCT Filed: Aug. 30, 2007

(86) PCT No.: PCT/JP2007/066882
§ 371 (c)(1),
(2), (4) Date: Apr. 21, 2008

(87) PCT Pub. No.: WO2008/029701
PCT Pub. Date: Mar. 13, 2008

(65) Prior Publication Data
US 2010/0059124 A1    Mar. 11, 2010

(30) Foreign Application Priority Data
Sep. 5, 2006 (JP) ................... 2006-239771

(51) Int. Cl.
*G05D 9/00* (2006.01)
*F22B 37/00* (2006.01)
(52) U.S. Cl. .............. 165/11.1; 165/301; 165/302
(58) Field of Classification Search .......... 165/11.1, 165/11.2, 301, 302
See application file for complete search history.

(56) References Cited

U.S. PATENT DOCUMENTS

| 2,254,389 | A | * | 9/1941 | Olcott | 165/301 |
| 2,412,573 | A | * | 12/1946 | Fraser, Jr. | 165/302 |
| 4,515,748 | A | * | 5/1985 | Fabregue | 165/11.1 |
| 4,836,274 | A | * | 6/1989 | Firth et al. | 165/11.1 |
| 5,500,039 | A | | 3/1996 | Mori et al. | |
| 6,375,718 | B1 | | 4/2002 | Blangetti et al. | |

FOREIGN PATENT DOCUMENTS

| CN | 1104743 A | 7/1995 |
| JP | 10-47014 A | 2/1998 |
| JP | 11-182212 A | 7/1999 |
| JP | 11-220853 A | 8/1999 |
| JP | 11-231082 A | 8/1999 |
| JP | 2001-54702 A | 2/2001 |
| JP | 2001-182555 A | 7/2001 |
| JP | 2001-201419 A | 7/2001 |
| JP | 2003-148165 A | 5/2003 |
| JP | 2006-97596 A | 4/2006 |

* cited by examiner

*Primary Examiner* — Ljiljana Ciric
(74) *Attorney, Agent, or Firm* — Birch, Stewart, Kolasch & Birch, LLP

(57) ABSTRACT

A gas leak detecting system for a gas cooler includes, a gas cooler (1) for cooling a gas, which is supplied to and discharged from the interior of a cooler water chamber (2) via piping, with a coolant supplied to and discharged from the interior of the cooler water chamber; an automatic exhaust valve (12) for automatically discharging the gas, which has leaked into the cooler water chamber, to the outside; a gas leak detecting vessel (8) for accumulating a leakage gas discharged from the automatic exhaust valve; and a gas detecting device (13) for detecting the leakage gas within the gas leak detecting vessel.

4 Claims, 6 Drawing Sheets

GAS LEAK DETECTING SYSTEM FOR GAS COOLER

BACKGROUND OF THE INVENTION

1. Field of the Invention

This invention relates to a gas leak detecting system for a gas cooler, which is used in a fuel gas compressor or the like.

2. Description of the Related Art

As this type of gas leak detecting system, there is, for example, one disclosed in Patent Document 1.

In this system, a separation tank for separating gases from cooling water is connected to an air vent pipe disposed to communicate with a water chamber of a hydrogen gas cooler, and a detecting device for a hydrogen gas is provided in the separation tank. When air is vented from the water chamber, leakage of a hydrogen gas is detected by the detecting device. This gas leak detecting system is described as enabling a hydrogen gas leak to be detected early, and action against this trouble to be taken promptly.

Patent Document 1: Japanese Unexamined Patent Publication No. 1999-220853

SUMMARY OF THE INVENTION

Problems to be Solved by the Invention

With the system disclosed in Patent Document 1, however, a control valve interposed in the air vent pipe is opened to detect the hydrogen gas leak. Thus, the hydrogen gas leak is detected in an air venting operation during periodical inspection, or is detected while the control valve is intermittently opened at predetermined intervals during operation of a turbine generator. This has posed the problem that gas leakage from the gas side to the cooling water side cannot be continuously monitored. Hence, a gas leak to the cooling water side, caused by damage to a tube or the like, is noticed from an unusual change in the pressure of the gas side, thus bringing the disadvantage that its detection takes time.

In addition, a hydrogen gas leak is detected in the separation tank which separates gases from cooling water flowing through the air vent pipe. Thus, the separation tank needs to be complicated in structure, thereby inducing a cost increase. Moreover, it becomes difficult to manage the level of cooling water within the water chamber (or the cooler body). This has also presented the problem that a backup system in the event of a trouble ascribed to the difficulty in management becomes insufficient.

The present invention has been accomplished in the light of the above-described situations. It is an object of the invention to provide a gas leak detecting system for a gas cooler, which can detect gas leakage continuously by a simple-structured system, and can ensure a fail-safe backup system against troubles based on such a simple system.

Means for Solving the Problems

A gas leak detecting system for a gas cooler according to the present invention, intended for attaining the above object, is a gas leak detecting system for a gas cooler, comprising: a gas cooler for cooling a gas, which is supplied to and discharged from an interior of a cooler body via piping, with a coolant supplied to and discharged from the interior of the cooler body; an automatic exhaust valve for automatically discharging the gas, which has leaked into the cooler body, to an outside; a gas leak detecting vessel for accumulating a leakage gas discharged from the automatic exhaust valve; and a gas detecting device for detecting the leakage gas within the gas leak detecting vessel.

In the gas leak detecting system for a gas cooler the automatic exhaust valve is of a float type having a mechanism which normally pushes up a float by the coolant to close a nozzle.

Further, in the gas leak detecting system for a gas cooler a leakage gas separating compartment having a perforated plate is defined at a location of an outlet for the coolant within the cooler body.

Further, in the gas leak detecting system for a gas cooler a level switch for detecting a leakage coolant discharged from the automatic exhaust valve is provided within the gas leak detecting vessel.

The gas leak detecting system for a gas cooler further comprises a level gauge and/or a level switch for detecting a level change in the coolant within the cooler body.

Effects of the Invention

According to the present invention, only a leakage gas can be introduced into the vessel by the automatic exhaust valve to detect gas leakage. Thus, the system of a simple structure enables a gas leak to be detected continuously, and facilitates the management of the coolant level within the cooler body, thus ensuring a fail-safe backup system against possible troubles.

DESCRIPTION OF THE NUMERALS

Figure 1:
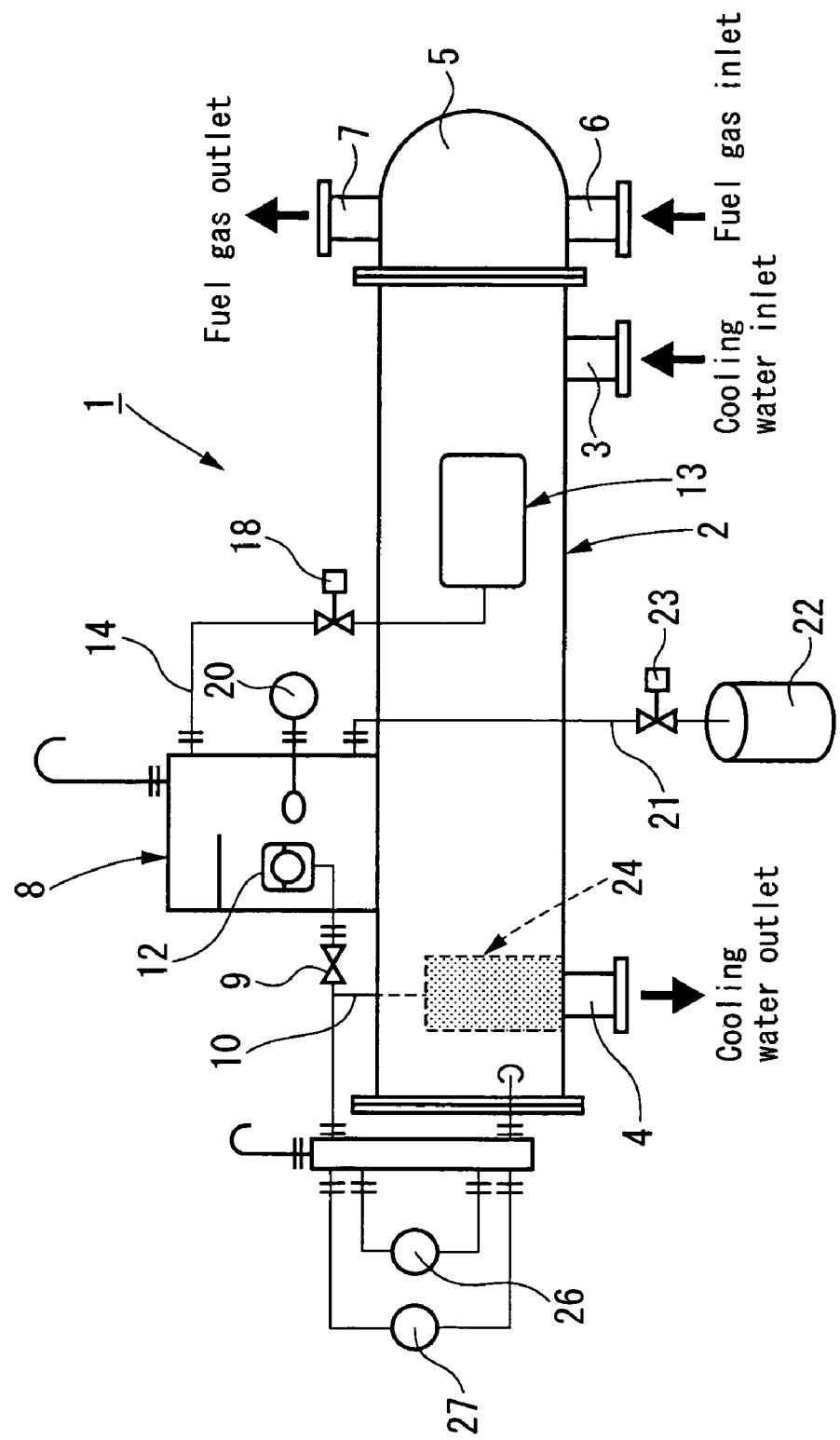
FIG. 1 is a conceptual drawing of a gas leak detecting system for a gas cooler, showing an embodiment of the present invention.

1 Gas cooler
2 Cooler water chamber
3 Cooling water inlet
4 Cooling water outlet
6 Fuel gas inlet
7 Fuel gas outlet
8 Gas leak detecting vessel
12 Automatic exhaust valve
13 Gas detecting device
20 Level switch
24 Leakage gas separating compartment
25*a* to 25*c* Perforated plate
26 Level switch
27 Level gauge

DETAILED DESCRIPTION OF THE INVENTION

A gas leak detecting system for a gas cooler according to the present invention will be described in detail by an embodiment with reference to accompanying drawings.

Embodiment

Figure 2:
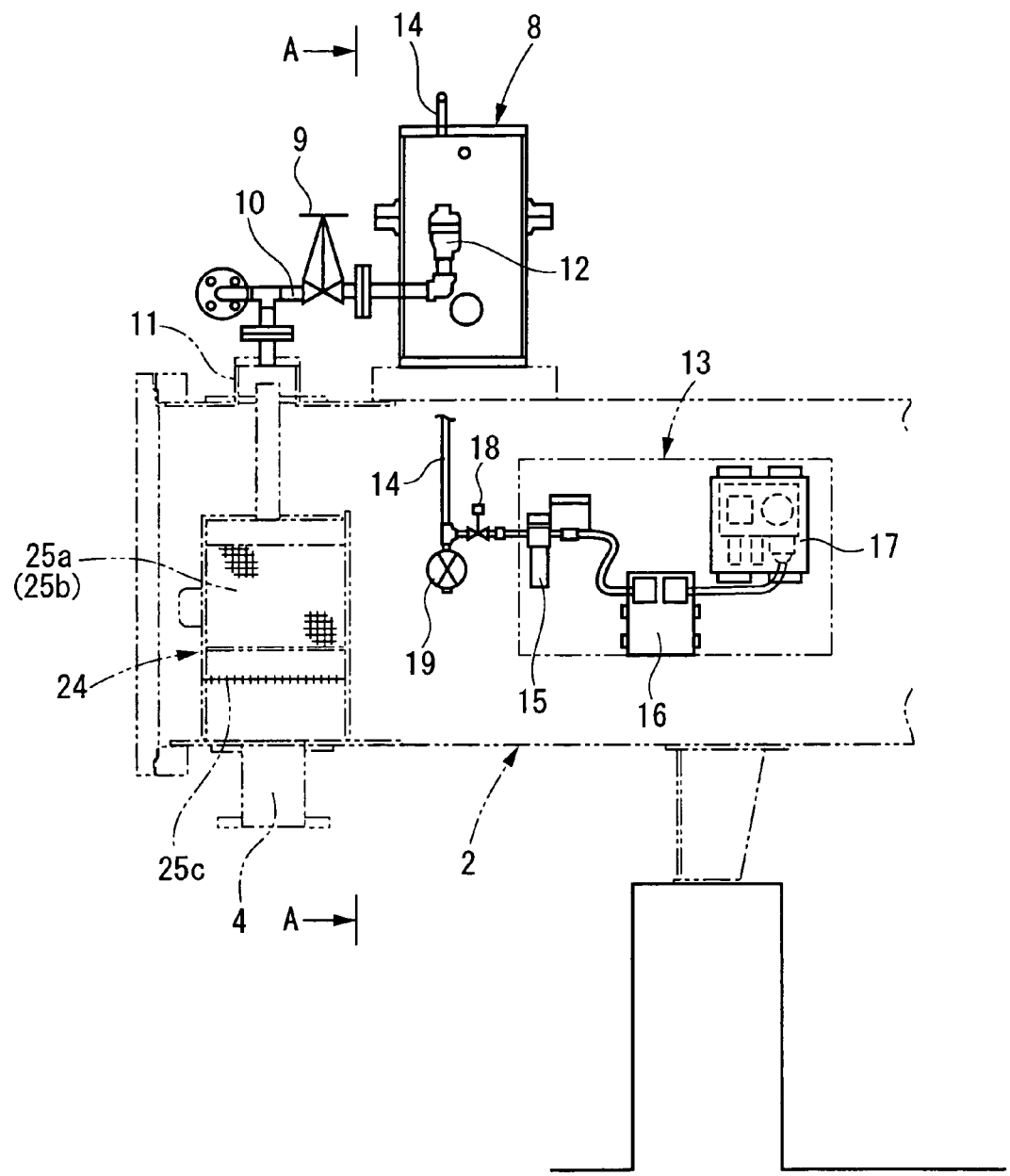
FIG. 2 is a front view of essential portions of the gas cooler.
Figure 3:
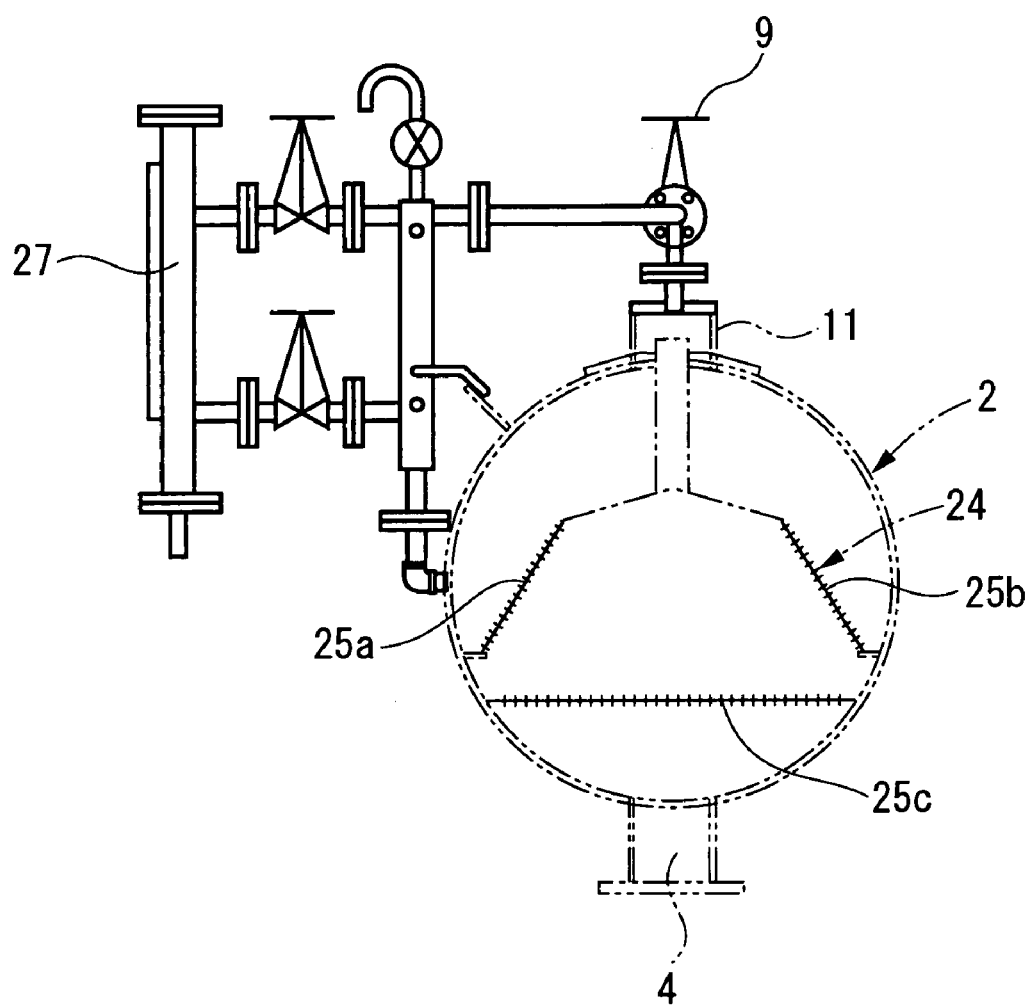
FIG. 3 is a side view of the essential portions of the gas cooler.
Figure 4:
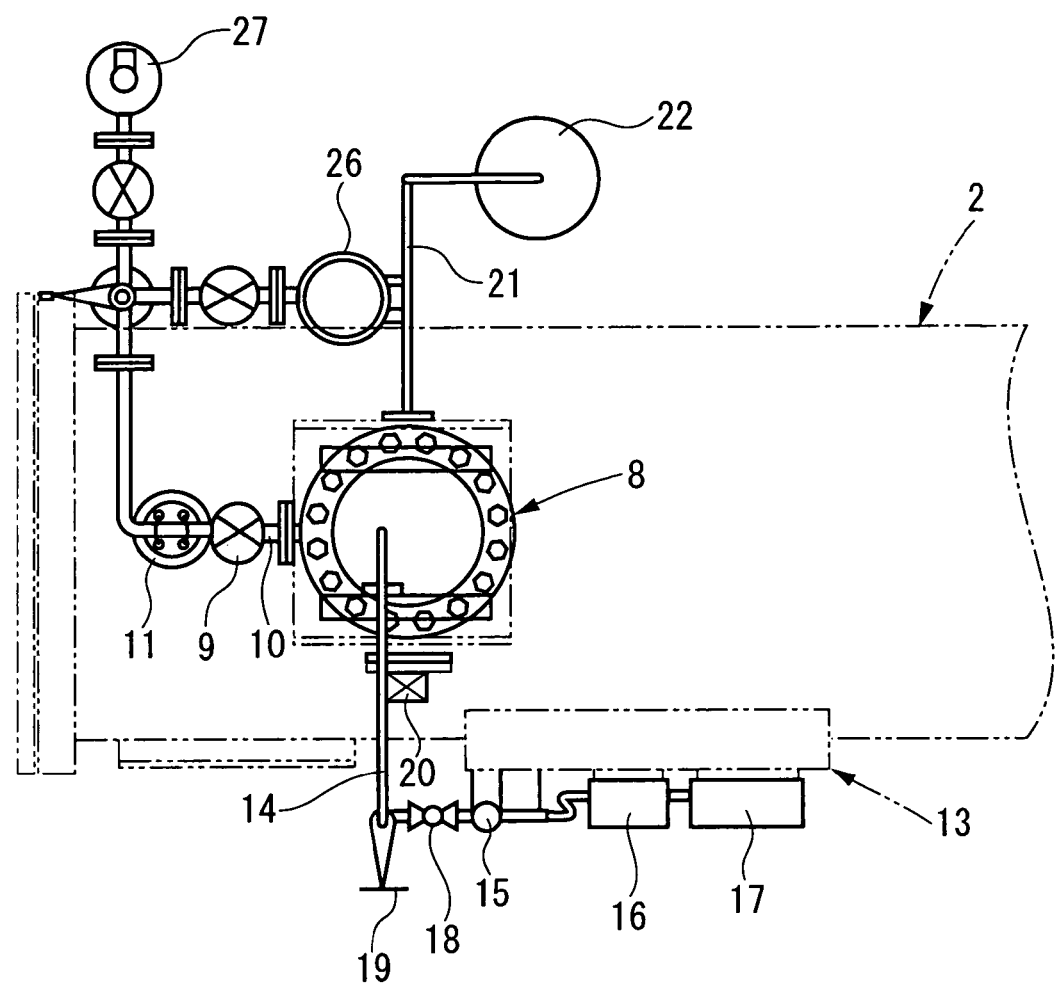
FIG. 4 is a plan view of the essential portions of the gas cooler.
Figure 5:
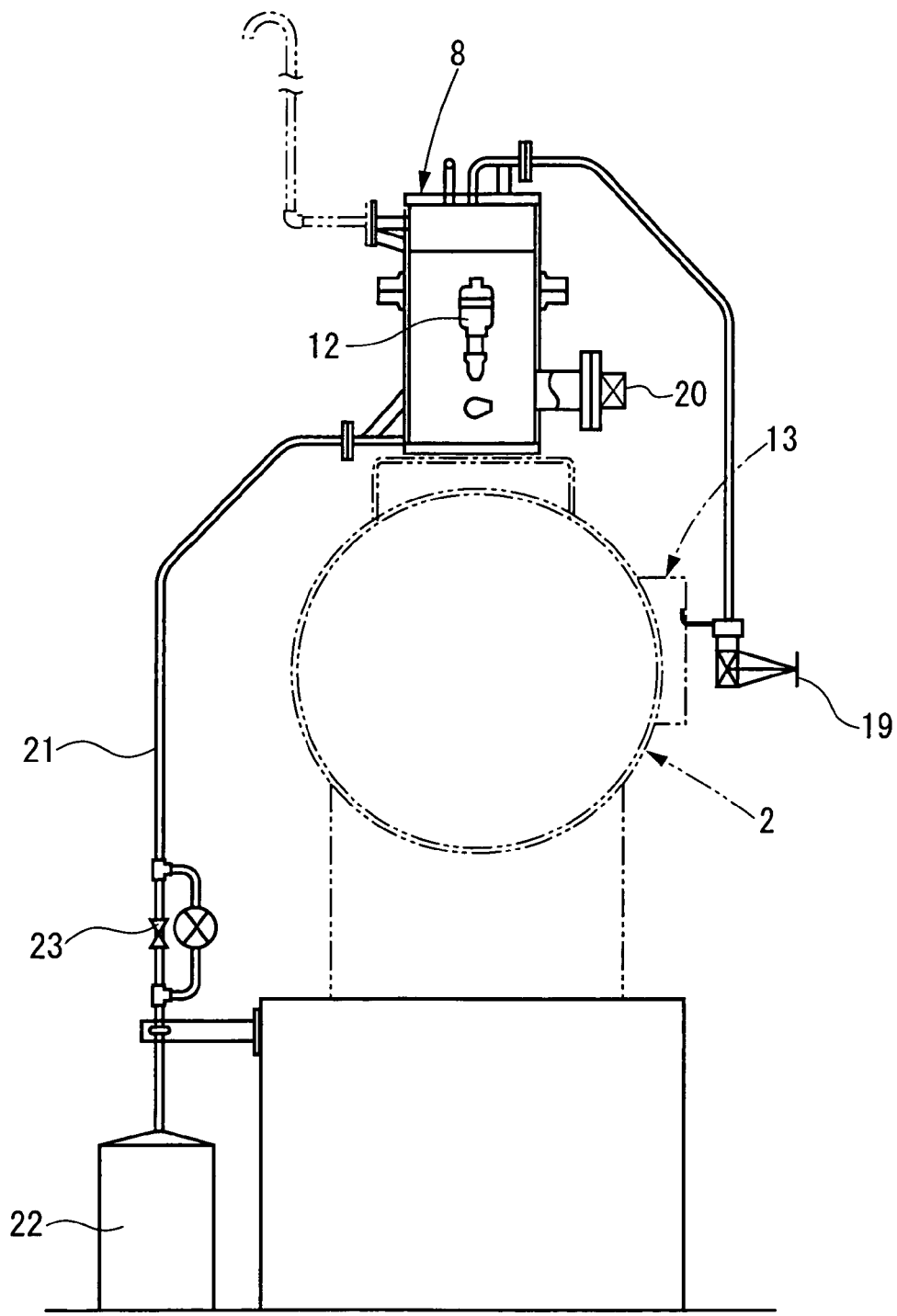
FIG. 5 is a sectional view taken on line A-A in FIG. 2.
Figure 6A:
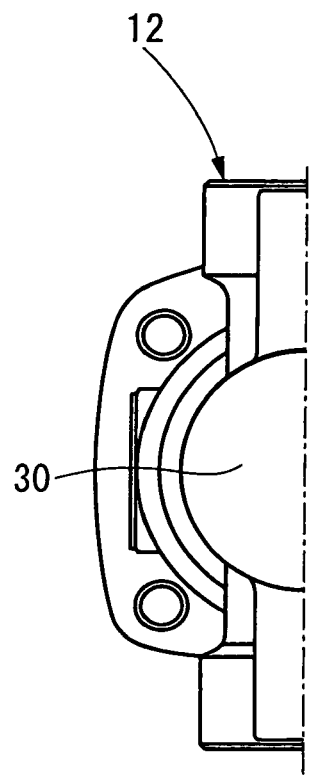
FIGS. 6(*a*) and 6(*b*) are explanation drawings of the structure of an automatic exhaust valve.
Figure 6B:
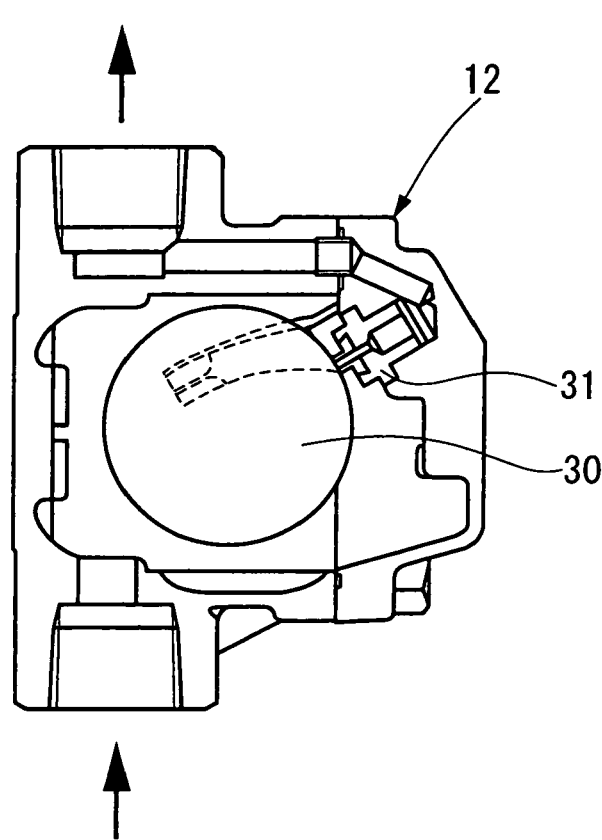

FIG. 1 is a conceptual drawing of a gas leak detecting system for a gas cooler showing an embodiment of the present invention. FIG. 2 is a front view of essential portions of the gas cooler. FIG. 3 is a side view of the essential portions of the gas cooler. FIG. 4 is a plan view of the essential portions of the gas cooler. FIG. 5 is a sectional view taken on line A-A in FIG. 2. FIGS. 6(a) and 6(b) are explanation drawings of the structure of an automatic exhaust valve.

In FIG. 1, reference numeral 1 denotes a shell- and tube-type gas cooler for cooling a fuel gas, such as LNG, which is supplied, for example, to a fuel gas compressor (not shown), with cooling water (coolant).

In this gas cooler 1, a cooler water chamber (cooler body) 2 is formed in a horizontally oriented drum shape. A cooling water inlet 3 is formed with an opening at a lower portion of one end side of the cooler water chamber 2, and a cooling water outlet 4 is formed at a lower portion of the other end side of the cooler water chamber 2. A fuel gas inlet 6 is formed with an opening at a lower portion of a header 5 annexed to one end side of the cooler water chamber 2, and a fuel gas outlet 7 is formed with an opening at an upper portion of the header 5.

Thus, cooling water, which has been supplied from a cooling water supply source (not shown) into the cooler water chamber 2 via the cooling water inlet 3, is circulated within the cooler water chamber 2, and then discharged through the cooling water outlet 4. On the other hand, a fuel gas, which has been supplied from a fuel gas supply source (not shown) into the header 5 via the fuel gas inlet 6, is admitted into the cooler water chamber 2, passed through a plurality of tubes (piping; not shown) arranged below the liquid level of cooling water filled, and thereby cooled upon heat exchange with cooling water. Then, the cooled fuel gas is supplied through the fuel gas outlet 7 to the fuel gas compressor via piping (not shown).

A gas leak detecting vessel 8, where a leakage gas discharged through an automatic exhaust valve 12 (to be described later) is accumulated, is installed at an upper portion of the outer periphery of the cooler water chamber 2. The gas leak detecting vessel 8 and the cooler water chamber 2 are connected by piping 10 equipped with an emergency manual opening and closing valve 9. As shown in FIG. 2, one end of the piping 10 is in communication with and connected to an exhaust port 11 formed with an opening at an upper portion of the outer periphery of the cooler water chamber 2. The other end of the piping 10 is mounted to protrude into the cooler water chamber 2. The above-mentioned automatic exhaust valve 12 for discharging the gas, which has leaked into the cooler water chamber 2, automatically into the gas leak detecting vessel 8 is attached to the other end portion of the piping 10.

The above automatic exhaust valve 12 is of a float type having a mechanism which normally pushes up a float 30 by cooling water to close a nozzle 31, as shown in FIGS. 6(a), 6(b). That is, when the fuel gas enters the valve, the fuel gas is accumulated above the float 30. When the fuel gas is accumulated in a certain constant amount or more, the float 30 lowers, whereupon the fuel gas is automatically discharged out of the valve. Upon discharge of the fuel gas, the float 30 rises again because of the ascending force of cooling water and, before cooling water leaks to the outside of the valve, the valve is sealed.

A gas detecting device 13 selective, for example, for methane, which detects a leakage gas within the aforementioned gas leak detecting vessel 8, is installed on a side portion of the outer periphery of the cooler water chamber 2. The gas detecting device 13 is brought into communication with and connected to an upper portion of the gas leak detecting vessel 8 by piping 14. As shown in FIGS. 2 and 4, the gas detecting device 13 of a suction type is employed, and comprises a filter unit 15, a pump unit 16, and a gas detector 17 disposed sequentially in the direction of a gas flow. An electromagnetic valve 18 for the gas detecting device 13, and a manual opening and closing valve 19 for an emergency are interposed in the piping 14.

A level switch 20 for detecting, at a predetermined height position, leakage cooling water discharged from the automatic exhaust valve 12 is installed in the gas leak detecting vessel 8, as shown in FIGS. 4 and 5. A lower portion of the gas leak detecting vessel 8 is brought into communication with and connected to a drain receptacle 22 via piping 21, and a draining electromagnetic valve 23 is interposed in the piping 21, as shown in FIGS. 4 and 5.

In the present embodiment, a tent-shaped leakage gas separating compartment 24 having perforated plates 25a, 25b, 25c is defined at the location of the cooling water outlet 4 within the cooler water chamber 2, as shown in FIGS. 2 and 3. Cooling water supplied into the cooler water chamber 2 flows into the compartment 24 through the perforated plates 25a, 25b provided at right and left side wall portions, passes again through the perforated plate 25c provided at a bottom wall portion, and arrives at the cooling water outlet 4, through which it is discharged to the outside.

A level switch 26 and a level gauge 27, as a backup, for detecting level changes of cooling water within the cooler water chamber 2 are externally mounted, as desired, via piping, as shown in FIGS. 3 and 4.

According to the above-described configuration, if a gas leak to the cooling water side occurs, for example, because of damage to the tube within the cooler water chamber 2, the leakage fuel gas is automatically discharged by the automatic exhaust valve 12 into the gas leak detecting vessel 8 placed above the cooler water chamber 2. This leakage is detected by the gas detecting device 13 to issue a gas leak alarm, for example.

Here, the speed of cooling water within the cooler water chamber 2 is set at a somewhat low value, and the cooling water outlet 4 is formed as an opening directed downward. Thus, the fuel gas which has leaked does not flow to the cooling water system located downstream of the cooling water outlet 4, but stays in an upper portion within the cooler water chamber 2. Hence, the leakage gas is reliably detected by the gas detecting device 13 after passing through the automatic exhaust valve 12.

Moreover, the leakage gas separating compartment 24 having the perforated plates 25a, 25b, 25c is defined at the site of the cooling water outlet 4. Thus, a further drop in the flow velocity of cooling water occurs there, so that a tiny leakage of the gas which has not been recovered within the cooler water chamber 2 is recovered nearly 100% by the perforated plates 25a, 25b, 25c.

A possible breakdown of the automatic exhaust valve 12 would be that a leakage gas cannot be discharged, or cooling water leaks, owing to the malfunction of the float 30 or the nozzle 31. In the present embodiment, if the leakage gas is no more discharged, the level switch 26 and the level gauge 27 installed as the backup permit a gas leak alarm, for example, to be issued according to a level change in cooling water within the cooler water chamber 2. If cooling water leaks into the gas leak detecting vessel 8, on the other hand, the level switch 20 within this vessel 8 detects it and generates a water leak alarm, for example.

According to the gas leak detecting system of the present embodiment, only a leakage gas can be introduced into the gas leak detecting vessel 8 by the automatic exhaust valve 12 to detect gas leakage. Thus, the system of a simple structure enables a gas leak to be detected continuously, and facilitates the management of the cooling water level within the cooler water chamber 2, thus ensuring a fail-safe backup system against possible troubles.

Furthermore, the gas leak detecting vessel 8 is installed by utilization of a site above the gas cooler 1 (cooler water chamber 2) which normally becomes a dead space. This brings the advantage that the effective use of space can be made.

It goes without saying that the present invention is not limited to the above embodiment, and various changes and modifications, such as changes in the structure of the automatic exhaust valve 12 or the gas detecting device 13, and changes in the structure of the leakage gas separating compartment 24 having the perforated plates 25*a*, 25*b*, 25*c*, may be made without departing from the gist of the present invention.

INDUSTRIAL APPLICABILITY

The gas leak detecting system for a gas cooler according to the present invention is preferred for use in a fuel gas compressor or the like of a power plant or an LNG plant.

The invention claimed is:

1. A gas leak detecting system for a gas cooler, comprising:
    a cooler body, for cooling gas, into which a coolant is supplied and from which the coolant is discharged via an outlet for the coolant;
    an automatic exhaust valve for automatically discharging the gas, which has leaked into the cooler body, to an outside;
    a gas leak detecting vessel for accumulating a leakage gas discharged from the automatic exhaust valve;
    a gas detecting device for detecting the leakage gas within the gas leak detecting vessel; and
    a leakage gas separating compartment provided inside the cooler body for recovering gas in the coolant, the leakage gas separating compartment having a perforated plate defined at a location of the outlet for the coolant within the cooler body.

2. The gas leak detecting system for a gas cooler according to claim 1, wherein
    the automatic exhaust valve is of a float type having a mechanism which normally pushes up a float by the coolant to close a nozzle.

3. The gas leak detecting system for a gas cooler according to claim 1, wherein
    a level switch for detecting a leakage coolant discharged from the automatic exhaust valve is provided within the gas leak detecting vessel.

4. The gas leak detecting system for a gas cooler according to claim 1, further comprising:
    at least one of a level gauge and a level switch for detecting a level change in the coolant within the cooler body.

* * * * *